United States Patent [19]

Welch

[11] 4,041,680

[45] Aug. 16, 1977

[54] COTTON BOLL GLEANER

[76] Inventor: James M. Welch, 22151 Wood Island Lane, Huntington Beach, Calif. 92646

[21] Appl. No.: 684,093

[22] Filed: May 7, 1976

[51] Int. Cl.² ............................................. A01D 46/08
[52] U.S. Cl. ....................................................... 56/28
[58] Field of Search ................................ 56/28, 328 R

[56] References Cited

U.S. PATENT DOCUMENTS

| | | | |
|---|---|---|---|
| 2,715,809 | 8/1955 | Buell | 56/28 |
| 2,928,224 | 3/1960 | Powell | 56/28 |
| 3,039,257 | 6/1962 | Brewster | 56/28 |
| 3,416,296 | 12/1968 | Culp | 56/28 |

Primary Examiner—Russell R. Kinsey
Attorney, Agent, or Firm—Dominick Nardelli

[57] ABSTRACT

A cotton boll gleaner is described wherein the elements for contacting the bolls are a plurality of rigid slender rods whereon barbs are randomly fixed, both axially and radially, so that the barbs extend away from the free end. At a point on the rods remote from the free end, the rod is pivotably coupled to an endless belt or chain. The belt revolves by engaging at least three rotating rollers so that there is a portion of the belt between two rollers moving parallel to and close to the ground, and there is another portion, also between two rollers, that is tilted from the vertical so that the rods depend freely from that portion of the belt. The belt preferably is rotated so that the rods move down along this tilted portion. When the rods are on the portion moving parallel to the ground, the rods are dragged along the ground with the barbs pointing forward so that any cotton bolls in their path are gleaned off the ground. When the rods enter the portion moving downward, gravity rotates the rods about a horizontal axis, so that the rods are in a depending position. At this point, when the rods are depending, means are provided to spin the rod 180° about a vertical axis to expose the cotton bolls thereon. An upward-moving brush is provided which now is able to lift and remove each boll from the rods. Before the respective rod passes over the following roller, the rods are spinned back 180° so they are ready to glean more bolls.

7 Claims, 5 Drawing Figures

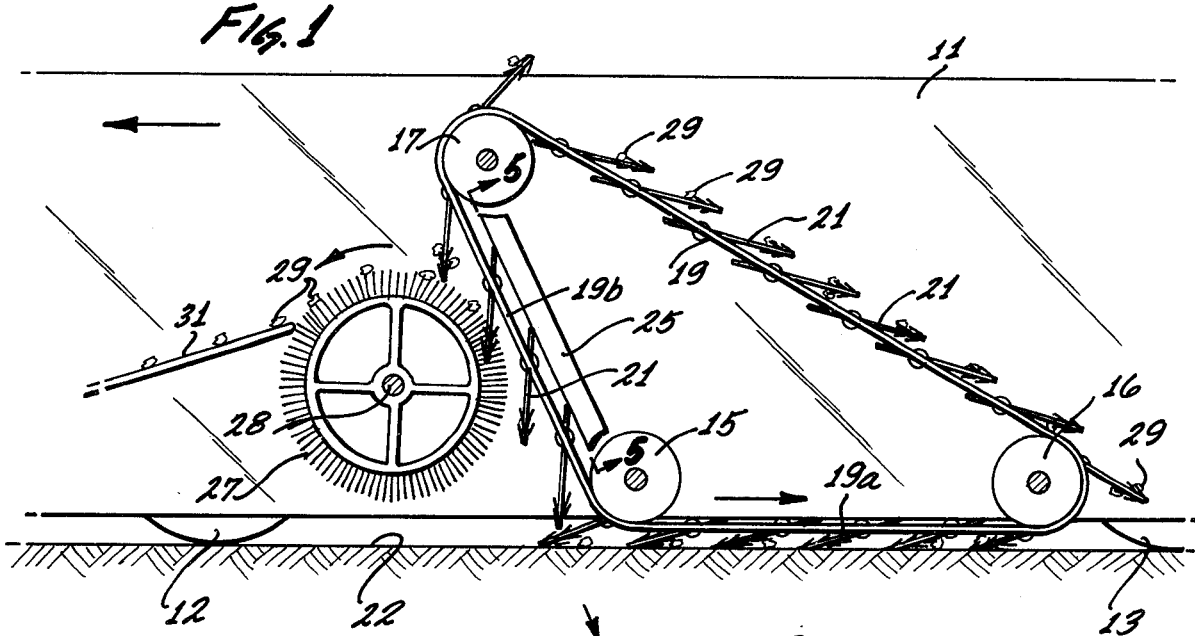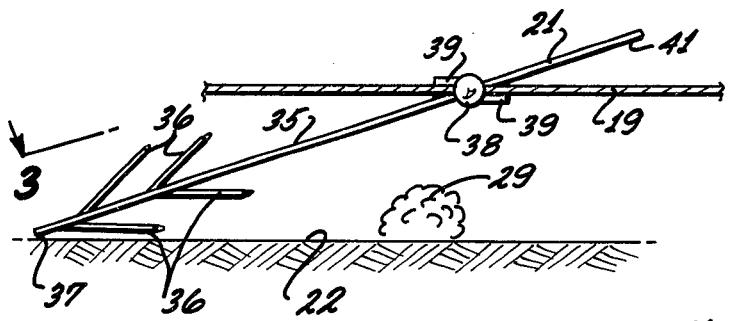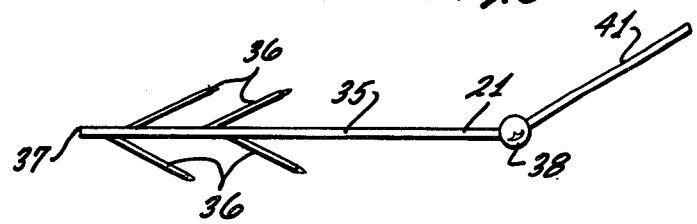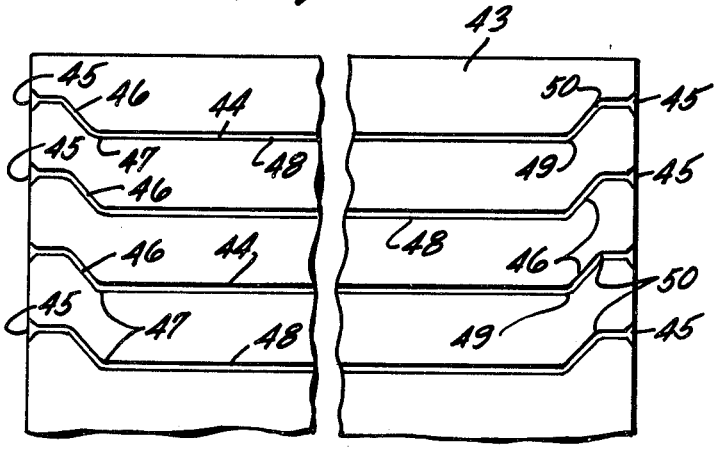

COTTON BOLL GLEANER

FIELD OF THE INVENTION

This invention relates to a device for salvaging scrap cotton bolls which may be dropped upon the ground during harvesting, picking or otherwise, and more particularly to a simple, more efficient device.

BACKGROUND OF THE INVENTION

During cotton picking time, much cotton is lost when the bolls fall on the ground. Present-day equipment is inefficient to gather these fallen cotton bolls. Prior art machines are either too complicated for the job, or if they are of simple design, these machines leave most of the cotton bolls on the ground after the device attempts to gather the bolls. In addition, most machines endeavor to spear the cotton bolls by some sort of spearing device on an endless belt, and they require devices, such as brushes, which rotate more rapidly than the moving belt, to disengage the bolls from the belt.

OBJECTS OF THE INVENTION

An object of this invention is to provide a more efficient cotton boll gleaner.

Another object of this invention is to provide a simple and more rigid cotton boll gleaner.

Another object of this invention is to provide a gleaning element for a cotton boll gleaner wherein the gleaning element points in the direction so that it gleans the cotton bolls on the ground and then, when the cotton is ready to be removed from the belt, the gleaning elements are in the reverse direction to facilitate removal of the bolls.

These and other objects and features of advantage will become more apparent after studying the following detailed description of the preferred embodiment of my invention, together with the appended drawings.

BRIEF DESCRIPTION OF THE DRAWINGS

FIG. 1 is a side sectional elevation of my novel device, schematically shown, not to scale.

FIG. 2 is an enlarged sectional view of a portion of the belt shown in FIG. 1, showing in greater detail the pivotal attachment of the gleaning element to the belt.

FIG. 3 is a view of the gleaning element, taken on line 3—3 of FIG. 2, with the element removed from the belt.

FIG. 4 is an end view of the gleaning element, as seen from the left of FIG. 3.

FIG. 5 is a sectional view taken on line 5—5 of FIG. 1 in the direction of the arrows, showing one part of the embodiment for the means for spinning the element on its own axis.

DETAILED DESCRIPTION OF THE DRAWINGS

Referring to FIG. 1, in particular, my cotton boll gleaner comprises, for example, a trailer made of a suitable frame 11 which can be box-like, of which a portion of one side is shown. On the frame 11 are mounted, for example, four wheels such as wheels 12 and 13 so that the trailer can be moved in the plane of the drawing and preferably to the right along a ground delineated by line 22. Extending transversely across the trailer and bearing-mounted to opposite sides of frame 11 are three rollers 15, 16, and 17 which are free to rotate about their respective axes. Around the rollers is disposed a flat belt 19 which could be made of any flexible material, for example, leather. Mounted on the belt 19 are a plurality of my novel gleaning elements 21. As will be explained hereinafter, each element 21 extends through the belt 19 and is free to pivot. Two of the rollers, 15 and 16, are positioned with reference to the frame 11 so that both rollers are on the same horizontal plane to cause a portion 19a of the belt 19 to be parallel to the ground 22. The third roller is then positioned, as shown, so that a portion 19b of the belt 19 is tilted from the vertical so that the elements 21 may freely depend vertically, for reasons that will become apparent hereinafter. On the inside of the portion 19b of the belt, there is fixed a means 25 which engages the portion of the elements 21 protruding through the belt and whose function will become more apparent hereinafter. Close to and outside the portion 19b of the belt there is positioned a cylindrical brush 27 which is bearing-mounted from the frame 11 to rotate about an axle 28. Since portion 19b of the belt is made to move down toward roller 15, the brush 27 is made to rotate counter-clockwise as shown by arrow. The function of this brush is to disengage the cotton bolls 29 off the respective elements 21. The bolls 29 are now free to travel along a plank means 31 to a place of storage.

Referring to FIG. 2, wherein an enlarged section is shown through the belt 19 to show how each of the elements 21 is preferably attached to the belt so that the elements may pivot with respect thereto, and also referring to FIGS. 3 and 4 wherein other views of the elements 21 are shown removed from the belt, the preferred details of the element 21 will now be described. Each element has a slender rigid rod-like body 35 having a plurality of barbs 36 fixed thereto, so that they are axially spaced along as well as radially spaced around the body. The barbs are slender, needle-like, rigid rods of smaller size than the body 35 which can be as much as ⅛ of an inch in diameter. The barbs 36 are fixed at an angle to the body 35, but extended away from a trailing end 37 which trails along the ground 22. The body 35 at the other end is made integral with a ball means 38 which is enclosed by a suitable socket 39 formed on the belt 19. The ball means 38 and socket 39 provide pivotal motion of the body 35 with respect to the belt. Also to the ball means 38 is fixed a rigid finger 41 which is part of the means (referred to in the abstract) to spin the rod body 35 about its axis. The other part of the means is means 25. One will note that body 35 and finger 41 form an obtuse angle, for reasons that will become apparent hereinafter.

Referring to FIG. 5 there is shown a view of the side of the means 25 adjacent to the belt 19. The means 25 is made, for example, of a plate or plank having a flat side 43 facing the belt 19. This plate is suitably fixed to the frame 11 to remain stationary therewith. On side 43 are formed a plurality of congruent grooves 44 which extend from the end of the plate 25 near roller 17 to the end of plate 25 near roller 15. The ends of the grooves 44 near roller 17 are formed into a delta 45 in order to readily receive the end of fingers 41. As shown in FIG. 5, the grooves 44 have a downward bend 46, then a right bend 47, a straight portion 48, and an upward bend 49, and another right bend 50 for reasons that will be explained hereinafter.

OPERATION OF THE INVENTION

To operate the novel gleaner, if it happens to be a trailer, one needs to couple it to a mobile means, not shown, to cause it to roll on wheels 12 and 13. As the trailer rolls and the wheels turn, suitable coupling means, not shown, would cause roller 16 to rotate and belt 19 to move counter-clockwise, as viewed in FIG. 1, if the trailer is being moved to the right. This causes the elements 21, as they touch the ground 22, to rotate clockwise, as shown by element 21 adjacent roller 15. The body 35, as shown in FIG. 2, points away from the direction of travel and the barbs 36 into the direction of travel so as to be able to pierce a cotton boll 29. The belt carries the respective element around roller 16. The elements then pass over roller 17 and, due to the force of gravity, the elements rotate downward when they are in the portion 19b of the belt. Now the bolls 29 are between the belt 19 and the body 35. The finger 41 on the element engages the respective groove 44 on plate 25. This insures that the body 35 remains in a vertical position. As the elements move down, the portion 19b and the finger 41 move from left to right, as viewed in FIG. 5, the finger 41 is urged laterally as it enters and moves through bend 46. This causes the body to spin, for example, in the clockwise direction as viewed in FIG. 4. The lateral motion of the end of the finger is such that the body 35 rotates almost 180° so that the bolls 29 are now exposed. The brush 27 which is rotating counter-clockwise readily lifts the bolls off the barbs and carries the bolls to the plank means 31.

Having described the preferred embodiment of my invention, one skilled in the art can devise other embodiments without departing from the spirit of my invention. Therefore, my invention is not to be considered as limited to the disclosed embodiment, but includes all embodiments falling within the scope of the appended claims.

I claim:
1. A cotton boll gleaner comprising:
a frame;
first means on said frame to move said frame along the ground;
an endless belt;
second means for mounting said belt on said frame to cause said belt to move down close to the ground, to rise, and again move down close to the ground;
a plurality of gleaning elements, pivotably mounted on said belt so that, as said belt passes the respective elements along the ground, the elements drag therealong to glean cotton bolls;
third means for removing the cotton bolls from said elements as said belt moves the elements toward the ground;
each of said elements comprising:
a slender, rigid rod-like body;
a plurality of barbs fixed by one end to said body so that said barbs are axially spaced along and radially spaced around said body;
a ball means fixed at one end of said body;
a finger fixed by one end to said ball means and forming an obtuse angle with said body; and
a socket fixed on said belt for pivotally supporting said ball means so that said body depends from said belt as said belt moves.

2. The gleaner of claim 1 wherein:
fourth means are provided between said first and second rollers and adjacent the downward moving portion of said belt to engage said fingers and rotate said body about itself.

3. The gleaner of claim 2 wherein said second means comprises:
a first and second rollers, each mounted on said frame to rotate about a horizontal axis;
said first roller being mounted higher than said second roller.

4. The gleaner of claim 1 wherein said fourth means has:
at least one groove extending from a first position near said first roller to a second position near said second roller; and
said groove being positioned to receive at said first position said finger and discharge said finger from said second position; and
said finger is disposed at an obtuse angle with said body; and
said groove is shaped so that said body is made to rotate about itself.

5. The gleaner of claim 4 wherein:
a cylindrical brush mounted on said frame and disposed to rotate about a horizontal axis;
said brush being disposed adjacent the portion of said belt moving down to the ground so that said brush lifts off any cotton bolls on said elements.

6. The gleaner of claim 5 wherein:
a third roller is provided in said second means; and
said third roller is substantially at the same height as said second roller.

7. The gleaner of claim 6 wherein said first roller is disposed a further horizontal distance from said third roller than said second roller, so that said bodies depend substantially vertical when between said first and second rollers.

* * * * *